United States Patent Office 2,800,487
Patented July 23, 1957

2,800,487

POLYOXYALKYLENE SUBSTITUTED HETEROCYCLIC AMINES AND THEIR AMMONIUM SALT DERIVATIVES

Victor Mark, Riverside, Ill., assignor to Universal Oil Products Company, Des Plaines, Ill., a corporation of Delaware No Drawing. Application December 31, 1952, Serial No. 329,092

4 Claims. (Cl. 260—319)

This invention relates to a novel class of heterocyclic compounds having surface active properties which are formed by the condensation of a polyoxyalkylene glycol or an alkylene oxide with a heterocyclic nitrogen compound containing at least one amino and/or imino group per molecule. The invention also relates to the cationic ammonium salts derived from the above-indicated amines by reaction of the heterocyclic nitrogen compound with an acid-acting substance.

The compounds of the present invention comprise a series of heterocyclic amine derivatives and their ammonium salt derivatives containing a hydrocarbon substituent having at least 3 carbon atoms attached to a carbocyclic or a heterocyclic ring thereof as a hydrophobic group and containing at least one polyoxyalkylene group attached to one or more nitrogen atoms of the heterocyclic or carbocyclic ring as the hydrophilic portion of the compound. These compounds, in general, have surface active properties and in particular instances act as detergents in aqueous solution; in other instances, they act as surface active compounds such as wetting and emulsifying agents in aqueous or non-aqueous solvents. One series of compounds comprising the present invention and characterized herein as heterocyclic amines are substantially non-ionic (or slightly cationic) surface active agents and have the following structure:

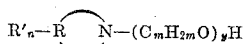

Another series of the present compounds having cationic properties in aqueous solutions thereof and which may be considered as the ammonium salt derivatives of the above non-ionic types of compounds have the following structure:

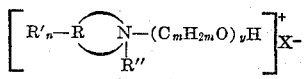

In both of the above series of compounds, N is the nitrogen atom of a mono- or polyhetero-, mono- or polycyclic ring system, represented by

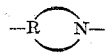

in the above formulas, R' is a hydrocarbon radical having at least 3 and not more than 20 carbon atoms attached to one of the cyclic rings, either on the heterocyclic ring or on a carbocyclic ring comprising the structure of the heterocyclic ring system, R" is selected from the group consisting of hydrogen, alkyl and aralkyl containing not more than a total of about 20 carbon atoms per group, $n$ is a whole number having a value from 1 to 3, $m$ is a whole number having a value of from 2 to 5, $y$ is a whole number having a value of from about 2 to about 30, and X represents an organic or inorganic anionic radical such as one of the group consisting of sulfate, acetate, sulfonate, halide, nitrate, sulfite, and carbonate.

Still another class of compounds, representing a distinct species of the general class of compounds herein characterized as N-(omega-hydroxyalkyl-polyoxypolyalkylene)-heterocyclic amines comprises the compounds having the following structural formula:

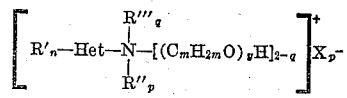

wherein R', R", $m$, $y$, and X have the designations hereinabove stated and R''' is a monovalent hydrocarbon radical, —Het— is a mono- or polycyclic heterocyclic ring system containing one or more oxygen, nitrogen or sulfur atoms, and $p$ and $q$ are numerals selected from 0 and 1. The heterocyclic ring of the compound (designated as "Het" in the above formula) may also contain an omega-hydroxyalkyl-polyoxypolyalkylene substituent on an imino nitrogen atom which forms a part of the heterocyclic ring system. When converted to a cationic compound by reacting the amine with an acid-acting reactant, the nuclear nitrogen atom may also be converted to a quaternary nitrogen atom. It is evident from a consideration of the numerical values ascribed to $p$ that when $p$ is 1, the foregoing cationic compounds are represented and when $p$ is 0, the foregoing non-ionic compounds are represented.

In one of its embodiments the present invention concerns a heterocyclic nitrogen-containing compound having at least one nuclear hydrocarbon substituent containing at least three carbon atoms and at least one N-(omega-hydroxyalkyl-polyoxypolyalkylene) group.

Another embodiment of the invention relates to a process for the preparation of a heterocyclic nitrogen-containing compound having at least one hydrophilic N-substituted polyoxypolyalkylene subsituent which comprises reacting a heterocyclic nitrogen compound containing at least one radical selected from the group consisting of a nuclear primary amino substituent, a nuclear secondary amino substituent and an imino group in the heterocyclic ring with an oxy-compound selected from the group consisting of an alkylene oxide, a polyoxypolyalkylene glycol containing from 2 to 5 carbon atoms per alkylene group thereof, and the α, ω-halohydrins corresponding to said glycol, said heterocyclic nitrogen compound being further characterized in that it contains from 1 to 3 hydrocarbon substituents containing a total of at least 3 carbon atoms.

The compounds of this invention which possess surface active properties are all members of a general class of compounds which contain in their structure a hydrophobic group, herein characterized as the hydrocarbon portion of the compound, including at least one and generally not more than 3 hydrocarbon substituents having a total of at least 3 carbon atoms, and a hydrophilic portion, herein characterized as an omega-hydroxyalkyl-polyoxypolyalkylene substituted nitrogen atom which contains a sufficient number of polyoxypolyalkylene units per group to provide the resulting product with surface active properties. The compounds are water-soluble if the number of hydrophilic polyoxypolyalkylene units per molecule is sufficient to solubilize the entire molecule in water and overcome the effect of the hydrophobic hydrocarbon portion of the molecule; in such compounds the effect of the hydrophilic group predominates over the effect of the hydrocarbon portion of the compound. On the other hand, the hydrophobic hydrocarbon groups in the structure of the compound may be predominant, in comparison with the hydrophilic portion of the molecule, in which case the product is generally soluble in non-aqueous solvents, such as long-chain alcohols, liquid hydrocarbons, oils etc. In each instance, however, in order for the ultimate product to possess surface activity, and particularly detergency, the compound must contain a sufficient number of hydrocarbon substituents or a single hydrocarbon group having a total of at least 3 carbon atoms substituted either on the heterocyclic nitrogen-containing ring, on a carbocyclic ring comprising the heterocyclic nitrogen ring as a part of a condensed ring system, or may comprise a hydrocarbon substituent attached to the nitrogen atom of a nuclear secondary amino substituent or the nitrogen atom of an amino group in the heterocyclic ring.

The surface active agents herein provided may be formed by several alternative procedures, although the procedure involving the following sequence of steps is generally considered most direct in producing the present compounds; (1) alkylating, if necessary, a heterocyclic nitrogen compound containing a nuclear primary amino substituent, a nuclear secondary amino substituent, and/or an imino group in the heterocyclic ring with an alkylating agent which results in the substitution of a hydrocarbon radical on the heterocyclic ring, preferably an alkylating group containing at least 3 carbon atoms per hydrocarbon radical, or otherwise synthesizing a heterocyclic nitrogen compound containing a nuclear alkyl, aryl or alkylaryl substituent, and (2) thereafter reacting the resulting heterocyclic nitrogen compound with an oxy-compound selected from the alkylene oxides, a polyoxypolyalkylene glycol and an α, ω-halohydrin of said glycol, the alkylene group of which contain from 2 to 5 carbon atoms per group under conditions whereby at least one hydrogen atom of an amino or imino group present in or substituted on the heterocyclic or carbocylic ring of the heterocyclic ring system condenses with the oxy-compound to form the hydrophilic polyoxypolyalkylene chain essential to the structure of the present surface active products. If a cationic compound is desired as the ultimate product of the process, the substantially non-ionic product of the above series of reactions may be subjected to an additional condensation reaction wherein the non-ionic omega-hydroxyalkyl-polyoxypolyalkylene substituted heterocyclic amine is reacted with an acid-acting substance such as a hydrogen acid, an alkyl- or aralkyl halide, sulfonate, carboxylate, etc. to form the corresponding quaternary compounds, when the latter are the desired products of the invention. It will be noted that by virtue of the choice of starting material, that is, by utilizing a heterocyclic nitrogen compound containing the aforementioned amino substituents and/or an imino group in the heterocyclic ring, the product resulting from the condensation with the oxy-compound contains at least one omega-hydroxyalkyl-polyoxypolyalkylene group attached to one or more of the amino and/or imino nitrogen atoms, and when the compound is dissolved in a solvent such as water the latter groups act in solution as hydrophilic substituents which tend to solubilize the entire compound. The present cationic products are ammonium-type salts capable of ionizing in aqueous solutions to form the corresponding ammonium cation associated with an anion derived from the acid-acting compound.

Although the heterocyclic nitrogen compounds utilized as starting material in the condensation with the oxy-compound may contain one to three nuclear hydrocarbon substituents having a minimum of from 1 to 3 carbon atoms, the preferred compounds of this invention have a carbocyclic ring which forms a part of a heterocyclic nitrogen-containing ring system and have at least 1 alkyl group attached to the heterocyclic and/or carbocyclic ring containing from 1 to 20 carbon atoms per alkyl group, the total number of carbon atoms in all of the alkyl groups combined being at least 3. These compounds have hydrophobic groups of sufficient effect in solution to cause the individual molecules of the compound to orient themselves in solution into micellar aggregates, believed to be essential to maximum surface activity, and particularly to detergency. Thus, the preferred products of this invention are the polynuclear compounds, including, for example, the alkyl indole condensation products of polyoxypolyalkylene glycols or alkylene oxides, the resulting alkylindole compounds having the following structure:

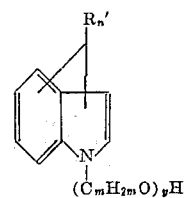

in which R′ is an alkyl group containing from 1 to about 20 carbon atoms, attached to either the heterocyclic or the carbocyclic portion of the indole molecule, $n$ is a whole number having a value selected from 1, 2, or 3, $m$ is a whole number having a value from 2 to 5 and $y$ is a whole number having a value from 2 to about 30, preferably from about 5 to about 20. In these compounds it is generally preferred that when R′ is a long-chain alkyl group containing from 6 to about 15 carbon atoms per group and $n$ is 1 or 2, $m$ preferably has a value of 2 to 3 and $y$ has a value from 10 to about 20 or greater depending upon the number of oxyalkylene units required to completely solubilize the compound in water.

The heterocyclic nitrogen compound containing at least one heterocyclic ring in which oxygen, nitrogen and/or sulfur form a part of the ring structure of the compound and which comprise the primary starting materials in the formation of the present surface active products may be selected from several alternative general classes of compounds, such as the alkyl pyrroles, including such compounds as 3-decylpyrrole, 3-(N,N-dimethylamino) - 4 - methylpyrrole, 3 - alkyl - 4 - amino-pyrroles, and the partially hydrogenated alkyl pyrroles and well as the perhydropyrroles (the pyrrolines and pyrrolidine), the alkylindoles, such as 4-hexylindole and the hydroalkylindoles, such as 4-octyl-1,2-dihydroindole, the alkyl N-hydropyridines, such as 3,4-diethyl-1,2-dihydropyridine, 1,2,3,6-tetramethylhydropyridine, and other alkyl-substituted hydrogenated pyridines, including the alkyl piperidines; the alkyl-substituted pr-aminoquinolines, hydroquinolines and isoquinolines, as well as the sec-amino-substituted quinolines, isoquinolines and their hydrogenated analogs; the alkylcarboazoles and hydrocarbazoles; the heterocyclic imino compounds containing a nitrogen atom in the heterocyclic ring of the molecule in addition to an imino group in the nucleus or a secondary or primary nuclear amino substituent, including the amino-substituted pyridines, the alkylated alpha-, beta-, and gamma-carbolines, the dicarbazoles, the 1- and 2-benzotriazoles, indazoles and isoindazoles (1,2-benzopyrazoles), the imidazoles, 1,2,3 - triazoles, and 1,2,4 - triazoles; the alkyl heterocyclic compounds which contain oxygen or sulfur in the heterocyclic ring, in addition to the functional imino group in the ring or amino substituent on the ring, including such compounds as the alkylated N-hydro-alpha- alpha-, beta-, and gamma-piperidones, the primary or secondary amino-substituted alkylthiophenes and benzothiophenes; the alkyl substituted 2,3-dihydroxazoles and 2,3,4,5 - tetrahydroxazoles, 2,3 - dihydrothiazoles, 2,3,4,5 - tetrahydrothiazoles 2, 1,3 -benzoxathiazoles N-hydrothiazoles and the N - hydrobenzothiazoles, the phenoxazines, and other compounds of the above general classes including the nuclearly amino and mono - alkylamino - substituted analogs thereof. The most suitable and generally preferred heterocyclic nitrogen compounds utilized in the condensation reaction with the oxy-compound are the heterocyclic compounds of the above general structure containing a long chain alkyl group having at least 6 carbon atoms per group, attached to either the heterocyclic or carbocyclic ring generally synthesized by well-known processes in the chemical arts. Thus, for example, one of the alkyl-substituted heterocyclic nitrogen compounds utilizable as one of the initial reactants in the process may be formed by thermal condensation of a pyrrole with a sodium alkoxide at temperatures of from about 200° to about 250° C., the resulting alkyl substituent on the pyrrole ring being the alkyl group present in the sodium alkoxide reactant. Other methods of synthesis involve the intra-condensation of the appropriate alkyl, aryl, or aralkyl - substituted keto- or aldo - substituted primary amines or nitrosubstituted aldehydrs or ketones in the presence of a reducing agent, such as a mixture of zinc and acetic acid, sodium amalgam, etc. Other methods of synthesis of these compounds are also available where one or more nuclear alkyl substituents are found to be desirable for the production of a compound having maximum surface activity. Although in most instances the heterocyclic nitrogen compound must be synthesized from other compounds by methods generally well-known in the art, certain members of the above series, such as the indoles, and pyrroles occur naturally in petroleum and coal tar distillation products and may be separated therefrom by fractional distillation or by other means. Other members of the above series of compounds utilizable as starting materials in the present process are derived from naturally occurring sources by alkylation and subsequent hydrogenation of either the heterocyclic nitrogen atom or the amination of the carbocyclic or heterocyclic nucleus of the heterocyclic nitrogen compound, as in the case of the amino or alkyl - substituted N - hydropyridines, the N - hydroquinolines and isoquinolines, etc. Those compounds which do not occur naturally may in certain cases by synthesized by direct alkyl substitution on the heterocyclic or carbocyclic ring, the amino or imino group being protected during the alkylation by acylation of the heterocyclic nitrogen compound prior to the alkylation reaction. Thus, for example, an N - acetylated heterocyclic nitrogen compound, such as an acetylated pyrrole may be condensed with an alkyl halide, such as decylbromide and the resulting alkylate subjected to hydrolysis in the presence of caustic to form the alkyl-substituted heterocyclic nitrogen compound utilized as starting material. It is to be emphasized that the essential structure of the present starting materials which enable the heterocyclic nitrogen compound to undergo condensation with the present oxy-compound reactants is the presence of a cyclic imino or a primary or secondary amino group (which contains active hydrogen atoms on the amino nitrogen atom) substituted on the heterocyclic ring or on a carbocyclic ring of a polycyclic, heterocyclic ring system, the active hydrogen substituent being involved in the condensation with the oxy-compound to form the ultimate omega - hydroxyalkyl - polyoxypolyalkylene chain comprising the hydrophilic portion of the present products. In specifying herein "a heterocyclic ring," it is intended that such term include not only the monocyclic ring systems in which the nitrogen atom is a part of the ring which makes it heterocyclic, but also the polycyclic ring systems in which one or more nitrogen, sulfur or oxygen atoms are present in the rings which make the nuclei heterocyclic. The essential structure of the above starting materials characterized as heterocyclic nitrogen compounds is the presence of at least one amino or imino group bearing an active hydrogen atom condensable with the oxy-compound reactant herein. Thus, the hydrogen bearing amino or imino groups may be a primary amino radical (—NH₂) or a secondary amino radical (—NHR, R being a hydrocarbon radical) substituted on one of the rings of the heterocyclic compound, or an imino group

present in the heterocyclic ring. The hydrophobic hydrocarbon group present in the structure of the final product may be present in the heterocyclic compound utilized as starting material in the process as one or more nuclear alkyl, aryl, or alkylaryl substituents or as the hydrocarbon group of a nuclear secondary amino substituent, the total number of carbon atoms in the combination of all of said hydrocarbon substituents being at least 3. The hydrophobic hydrocarbon group may be made up of two or three nuclear short chain alkyl substituents attached to the heterocyclic ring, to a carbocyclic ring of a heterocyclic condensed ring nitrogen compound or to the nitrogen atom of a nuclear secondary amino substituent or may be made up of a single long chain alkyl group attached to either the heterocyclic or carbocyclic rings or to the nitrogen atom of a nuclear secondary amino substituent.

The compounds of the present invention herein referred to as the non-ionic or slightly cationic types of surface active agents are formed by condensing the heterocyclic nitrogen compound with an alkylene oxide, a polyoxypolyalkylene glycol, or an α,ω-halohydrin corresponding to said glycol to introduce at least one omega-hydroxyalkyl-polyoxypolyalkylene radical on each of the one or more amino or imino nitrogen atoms in the structure of the heterocyclic nitrogen compound. Products having maximum surface activity or detersive properties may be formed by controlling the condensation reaction to obtain a balance between the effect of the resulting hydrophilic polyoxypolyalkylene chain and the hydrophobic effect of the hydrocarbon portion of the heterocyclic nitrogen molecule. The chain length of the polyoxypolyalkylene group required to form a product of maximum detergency varies in accordance with the number of carbon atoms in the hydrocarbon portion of the molecule which may originally be present in the alkyl-substituted heterocyclic nitrogen ring and also depends upon the number of water-solubilizing oxyalkylene units in the molecule as well as the ratio of oxygen to carbon in the polyoxypolyalkylene chain. Thus, of the various species of alternative reactants which may be utilized in the present process, the selection of the most desirable polyoxypolyalkylene glycol or alkylene oxide for condensation with the heterocyclic nitrogen compound is a matter of trial for each of the various starting materials utilizable in the condensation reaction to determine the point at which optimum detergency or surface activity is observed. In general, in those instances in which the heterocyclic nitrogen compound is a monocyclic compound containing a short chain alkyl substituent or a small hydrocarbon group, the condensation reaction with the oxy-compound is controlled to limit the chain length of the polyoxypolyalkylene radical to a relatively short chain group containing not more than about 10 oxyalkylene units per group and the chain may be made up of oxybutylene or oxyamylene units which have less effect in water solubilizing the product than a polyoxypolyethylene or a polyoxypolypropylene group. In the case of the species of the present product having a carbocyclic ring as a part of a heterocyclic nitrogen-containing ring of a condensed ring system, the hydrophobic hydrocarbon portion of the molecule has a somewhat greater influence in determining the hydrophobic-hydrophilic balance, and consequently a greater number of oxyalkylene units are required to obtain the desired balance between the hydrophobic and hydrophilic radicals. For the latter types of compounds the hydrophilic chain is preferably a polyoxypolyethylene or a polyoxypolypropylene chain which have maximum water-solubilizing effect in determining the hydrophilic-hydrophobic balance. For compounds of the latter structure, the hydrophilic chain preferably contains from about 8 to about 20 oxyalkylene units per molecule, although longer chains may be preferred for the polycyclic ring compounds containing two and three condensed ring nuclei. In the species of the present detergent type compounds containing a long chain alkyl substituent attached to either of the heterocyclic ring or the carbocyclic ring of a polynuclear compound, generally the preferred structure for the present product having detergent properties, the poly-(oxyalkylene) chain is preferably made up of oxyethylene or oxypropylene units and the total number of such units per molecule is preferably from about 10 to about 30 or more in order to obtain the desired hydrophilic-hydrophobic balance of the compound in solution.

The poly-(oxyalkylene) glycols utilizable in the present process for condensation with the heterocyclic nitrogen compound include the polyethylene, polypropylene, polybutylene and polyamylene glycols containing an average of at least 2 and generally not more than about 30 oxyalkylene units per molecule, although for the heterocyclic nitrogen compounds containing 2 or more nuclei per molecule, the glycol may contain an average of more than 30, but generally not more than about 50 oxyalkylene units per molecule, depending upon the number of carbon atoms per alkylene chain. In place of the above glycols, the corresponding $\alpha,\omega$-halohydrins may be utilized as the oxycompound reactant in the process. When the non-ionic product is prepared from an alkylene oxide, the heterocyclic nitrogen compound is reacted with ethylene oxide, propylene oxide, butylene oxide or amylene oxide under condensation reaction conditions and for a reaction period of sufficient duration to obtain a resulting poly-(oxyalkylene) radical of the desired chain length. Since most poly glycols occur as a mixture of individual compounds varying in the number of oxyalkylene units per molecule and since the condensation of the alkylene oxide with the heterocyclic nitrogen compound may proceed at different rates with different individual molecules of the heterocyclic nitrogen compound present in the reaction mixture subjected to condensation with the alkylene oxide, the oxyalkylene chains attached to the one or more nitrogen atoms of the resulting amine may vary in any given reaction mixture and the specifications herein referring to the number of oxyalkylene units per molecule is intended to represent the average number of oxyalkylene units in any given mixture of the condensation product.

The condensation of the heterocyclic nitrogen compound or its nuclear mono- or polyamine- and/or alkyl-substituted derivatives with the poly-(oxyalkylene) glycol, its halohydrin derivative or an alkylene oxide is effected thermally by heating a mixture of the alkylene oxide, glycol, or halohydrin and the heterocyclic nitrogen compound to a temperature of from about 50° to about 200° C., preferably at a temperature at from about 100° to 160° C., the reactants generally being charged into a pressure autoclave wherein the heterocyclic nitrogen compound and the oxy-compound are reacted at a superatmospheric pressure sufficient to maintain the reactants in substantially liquid phase as the mixture is stirred to obtain intimate contact between the reactants. The oxy-compound charged to the reaction mixture will generally condense equally with all of the functional imino and amino groups present in the heterocyclic nitrogen compound. Thus, for a compound containing a single imino group in the heterocyclic ring and/or a single secondary amino group attached to the heterocyclic or to a carbocyclic ring of the reactant, both imino groups will generally react with the oxy-compound to form two N-($\omega$-hydroxyalkyl-polyoxypolyalkylene) chains of approximately equal length. In the case of the primary amino-substituted heterocyclic nitrogen compounds, the resulting condensation product will contain two polyoxyalkylene chains on the nitrogen atom of the amino substituent and one containing approximately the same number of oxyalkylene units per chain on the nitrogen atom of the imino group when present in heterocyclic ring. When utilizing the preferred alkylene oxide as the oxycompound for producing the long chain poly-(oxyalkylene) radical, the condensation reaction is continued until the chain length of the poly-(oxyalkylene) group is sufficient to impart the desired degree of surface activity to the ultimate product. When utilizing a polyalkylene glycol or an $\alpha,\omega$-halohydrin derivative thereof in the condensation reaction, the glycol charged to the reaction mixture initially contains the desired number of oxyalkylene units per molecule to form a resulting condensation product having the desired degree of water-solubility or oil solubility, and surface activity. Suitable pressures for the condensation reaction, particularly when utilizing an alkylene oxide reactant are from about 2 to about 100 atmospheres, depending upon the desired chain length of the oxyalkylene radical in the ultimate product. The condensation is promoted by basic catalysts, such as sodium hydroxide, a sodium alkoxide, such as sodium monoethanolate, pyridine, trimethyl amine, and other basic amines which are mixed with the reactants in an amount of from about 0.1 to about 10% by weight of the heterocyclic nitrogen compound charged into the reaction.

The compounds formed as a product of the condensation of the alkylene oxide or poly-(oxyalkylene) glycol with the heterocyclic nitrogen compound are substantially non-ionic or slightly cationic surface active agents, the surface activity and water-solubility depending upon the number of carbon atoms in the alkylene group of the oxyalkylene unit, the number and size of the rings comprising the heterocyclic portion of the compound, the number and chain length of the alkyl group or groups and the number of amino groups attached to the heterocyclic or carbocyclic ring comprising the structure of the resulting compounds. Further control of the water-solubility as well as other physical properties of the final product are dependent upon whether the compound is converted to an ammonium type cationic salt and more specifically is dependent upon whether hydrogen, an alkyl group or an aralkyl group is present as a substituent on the amino nitrogen atom having attached thereto the polyoxyalkylene radical. The present cationic detergents capable of ionizing in solution form an ammonium cation may be prepared by reacting the non-ionic product formed in the preceding series of condensation reactions with an organic or inorganic acid or acid-acting alkyl halide, alkyl sulfate, a nitroalkane, a sulfoalkane or an aralkyl halide at reaction conditions sufficient to condense the acid-acting compound with at least one of the nitrogen atoms constituting a nuclear primary or secondary amino substituent or an imino group in the heterocyclic ring. The resulting reaction forms a positively charged quaternary radical capable of ionizing in solution to form a cation in which the organic portion of the acid-acting compound combines with the unshared pair of electrons of the nitrogen atom and the electronegative portion of the acid-acting compound an electronegative anion in solution. The reaction of the non-ionic or slightly cationic primary reaction product with the acid-acting compound such as an alkyl halide is represented by the following equation:

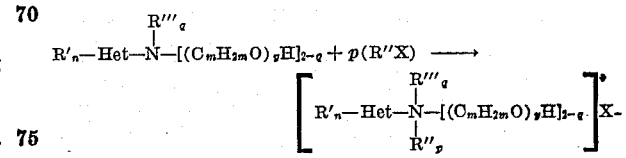

wherein X represents the halide radical of the acid-acting halide reactant and R″ represents the alkyl radical thereof which becomes attached to the nitrogen atom of a substituent primary or secondary amino group of the heterocyclic amine reactant by a semi-polar bond. In the event that a heterocyclic compound containing one or more imino groups as part of the heterocyclic ring system is utilized in the condensation reaction with the oxy-compound, the heterocyclic ring, after reaction of the condensation product with the acid-acting compound, will also contain an R″ hydrogen or hydrocarbon group on each of said imino nitrogen atoms. The cationic type of compound formed in the present process from the non-ionic or slightly cationic product formed in the initial reaction may also be prepared by simply adding to the non-ionic amine at least a stoichiometric equivalent of a mineral acid. When utilizing an acid, such as sulfuric acid, hydrochloric acid, acetic acid, bezene sulfonic acid, oxalic acid, etc. the group R″ is hydrogen, while in the case of utilizing an alkyl or aralkyl halide, sulfate etc. in an amount equivalent to at least an equimolar proportion of the acid-acting alkyl or aralkyl compound and preferably from about 1.5 to about 2 or more molar proportions thereof per acid reactive imino or amino group in the structure of the non-ionic compound, R″ is the alkyl or aralkyl portion of the acid-acting compound. The reaction of the non-ionic compound with the acid-acting alkyl or aralkyl mono- or bivalent compound occurs at temperatures of from about 30° to about 100° C. and at a pressure sufficient to maintain the reactants in substantially liquid phase. The preferred acid-acting compounds for this purpose contain a relatively small R″ group, such as methyl, ethyl, propyl, benzyl, etc. which have less effect in reducing the water-solubility of the ultimate product than compounds in which the R″ group is a large hydrocarbon radical.

In specifying herein such terms as "imino" and "amino" groups, it is intended to designate the mono- and di-hydrocarbon or omega-hydroxyalkyl-poly-(oxyalkylene) substituted groups, respectively. Thus, the "amino" group may contain one or two hydrocarbon radicals or a single hydrocarbon and a single poly-(oxyalkylene) or two poly-(oxyalkylene) groups, the latter compounds also being referred to as "amines."

In many instances a more active detergent or a product having greater stability results by subjecting the final product or the alkylheterocyclic nitrogen compound to reduction in the presence of hydrogen whereby any unsaturated bonds in the structure of the compound become saturated to form a perhydro-heterocyclic compound having greater surface activity or lesser sensitivity to chemical change. For this purpose and one of the preferred procedures therefor comprises contacting the heterocyclic nitrogen compound or the condensation product thereof with the oxy-compound with hydrogen in the presence of a hydrogenation catalyst, generally utilizing superatmospheric pressures of hydrogen of from about 5 to about 100 atmospheres and temperatures of from about 50° to about 350° C. Suitable hydrogenation catalysts for the reduction include one or more metals or metal oxides selected from the platinum and iron group metals of the Periodic Table such as platinum, palladium, nickel and/or cobalt, etc. and may be deposited or composited with a refractory metal oxide support such as silica and/or alumina.

The non-ionic and cationic products of this invention vary in form from relatively viscous liquids to semi-solid waxy and wax-like materials which melt over a wide temperature range, generally below the boiling point of water. In order to further enhance the water-solubility of the product, the non-ionic or cationic compound may be composited with an inorganic salt, such as an alkali metal halide or silicate, and alkaline earth metal halide, or an alkali or ammonium sulfate, sulfite, carbonate, bicarbonate or phosphate salt, the alkaline earth metal halides, such as calcium chloride, being preferred for this purpose. Other detergent aids may also be added to the present products in order to increase their surface activity or enhance other properties with respect to their use as surface active agents, including such compounds as carboxymethyl cellulose etc.

The products of this invention which have the structure of N-(omega-hydroxyalkyl-polyoxypolyalkylene)-heterocyclic amines may in specific instances be useful as pharmaceuticals, germicides, or as intermediates for the preparation of medicinals having biological activity and in other instances the compounds may serve as plasticizers and as intermediates for the production of waxes, plastics and resinous products, and as insecticides, in addition to their use as surface active agents. For such uses other substituent groups or radicals, such as halogen, amino, nitro, etc. may be introduced into the molecular structure of the compounds in order to enhance their reactivity or change their solubility in special solvents.

The present invention is further illustrated with respect to several of its specific embodiments in the following examples, which, however, are not intended to define particular limits on the process, or on the composition of the compounds in accordance with the examples given below.

EXAMPLE I

A series of indoles and 5-alkyl-substituted indoles in which the alkyl group is selected from ethyl, propyl, hexyl, nonyl and dodecyl groups, are utilized as starting materials in the preparation of the corresponding mono-N - (omega - hydroxymethyl - polyoxyethylene) - heterocyclic amine derivatives containing from 2 to an average of 30 oxyethylene units per molecule in which the polyoxypolyethylene chain is substituted on the imino nitrogen atom of the heterocyclic nitrogen ring present in the structure of the indole. In the preparation of these derivatives, ethylene oxide is reacted with the indole and the 5-alkyl indoles in the presence of finely powdered sodium hydroxide which acts catalytically in the reaction mixture to promote the resulting condensation reaction, utilizing molar ratios of ethylene oxide to the indole compound which will provide the desired number of oxyethylene units per molecule of the product. The indole is charged into a pressure autoclave, followed by the addition thereto of 1% by weight of the indole of the sodium hydroxide catalyst, which is mixed with the indole to form a suspension. Ethylene oxide is thereafter charged into the autoclave until the desired molecular ratio of the indole compound to ethylene oxide is present in the reaction mixture. The pressure within the autoclave is increased to 1000 lbs./in.$^2$ with nitrogen and the contents of the autoclave thereafter heated to 160° C. for three hours, while the reaction mixture is stirred by rotation of the autoclave. Following the indicated reaction period, the autoclave is cooled to room temperature and the pressure released. The ethylene oxide condensation product of the indole compound is decanted at a temperature above its melting point from the caustic and reserved for examination. Analysis of the product for hydrogen, nitrogen, and carbon indicates that condensation has occurred between the ethylene oxide and indole reactants to yield a condensation product containing the theoretical quantity of oxygen corresponding to the length of the polyoxyethylene chain derived from the predetermined quantity of ethylene oxide charged to the reaction mixture. The physical and surface active properties of the resulting product are indicated in the following Table I for the various derivatives as indicated above.

Table I

PHYSICAL PROPERTIES OF ETHYLENE OXIDE-INDOLE AND ETHYLENE OXIDE-ALKYLINDOLE CONDENSATION PRODUCTS

| Indole Compound | No. of —OCH$_2$CH$_2$— Units/Molecule | Detergency,[1] Percent of SDBS [2] | Solubility in Water @ 70° C. | Appearance @ 35° C. |
|---|---|---|---|---|
| Indole | 2 | <10 | slightly soluble | liquid. |
| Do | 10 | <10 | solid | paste. |
| Do | 16 | <10 | soluble | waxy-solid. |
| Do | 22 | <10 | do | Do. |
| 5-methyl indole | 2 | 51 | sparingly soluble | liquid. |
| Do | 6 | 40 | forms cloudy solution | viscous liquid. |
| Do | 10 | 30 | soluble | paste. |
| Do | 15 | 23 | do | solid. |
| Do | 20 | 21 | very soluble | Do. |
| 5-propyl indole | 2 | 61 | sparingly soluble | liquid. |
| Do | 6 | 85 | forms cloudy solution | viscous liquid. |
| Do | 10 | 62 | soluble | paste. |
| Do | 15 | 58 | do | solid. |
| Do | 20 | 56 | do | Do. |
| 5-hexyl indole | 2 | 58 | sparingly soluble | liquid. |
| Do | 6 | 93 | do | viscous liquid. |
| Do | 10 | 115 | soluble | paste. |
| Do | 16 | 120 | do | solid. |
| Do | 20 | 108 | very soluble | Do. |
| Do | 24 | 96 | do | Do. |
| 5-Nonyl indole | 6 | 89 | slightly soluble | viscous liquid. |
| Do | 10 | 135 | soluble | paste. |
| Do | 12 | 140 | do | Do. |
| Do | 16 | 131 | do | waxy of low M. P. |
| Do | 20 | 110 | do | waxy. |
| Do | 24 | 72 | very soluble | Do. |
| 5-Dodecyl indole | 6 | 85 | slightly soluble | viscous liquid. |
| Do | 12 | 131 | forms cloudy solution | thick paste. |
| Do | 18 | 159 | soluble | waxy. |
| Do | 24 | 145 | very soluble | Do. |
| Do | 30 | 131 | do | Do. |

[1] Detergency is measured in accordance with the standard Launder-O-Meter procedure at 140° F., utilizing hard water containing 300 p. p. m. of CaCO$_3$ hardness to which 0.15% by weight of sample is added. Detergency is expressed as the ratio of reflectance from soiled muslin laundered under equivalent conditions in a solution of the sample compared to the soiled muslin laundered in an aqueous solution of a standard detergent comprising a 40% sodium dodecylbenzenesulfonate-60% sodium sulfate mixture, a built detergent composition which has greater detergency than pure sodium dodecylbenzenesulfonate alone. Detergency for the standard is considered as 100% for purposes of comparison.

[2] SDBS = sodium dodecylbenzenesulfonate.

EXAMPLE II

An alkylphenyl-substituted pyrrole (hexylphenylpyrrole, prepared by reacting sodium hexylphenolate with pyrrole at 230° C.) is converted into a series of surface active compounds by reacting the hexylphenylpyrrole with propylene oxide at reaction conditions similar to those utilized in Example I, above, for the reaction of ethylene oxide with the indicated indole derivatives. Of the various N-(omega-hydroxypropyl-polyoxypolypropylene) derivatives prepared (containing 2, 6, 10, 15, 20, and 24 oxypropylene units per molecule), the product containing an average of 20 oxypropylene units on the imino nitrogen atom of the resulting pyrrole derivative possesses the greatest detergency (about 142% of a 40% sodium dodecylbenzene-sulfonate-60% Na$_2$SO$_4$ mixture at equivalent test conditions) and is sufficiently soluble in water to yield a 0.25% aqueous detergent solution. The compound is a waxy solid.

I claim as my invention:

1. A compound having an alkyl group of from 6 to about 15 carbon atoms attached to one of the rings in the structure

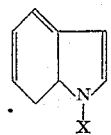

wherein X is an omega-hydroxyalkyl-polyoxyalkylene group containing from about 5 to about 20 oxyalkylene units.

2. A compound having the general formula:

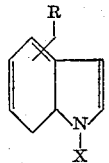

wherein R is an alkyl group containing from 6 to about 15 carbon atoms and X is an omega-hydroxyalkyl-polyoxyalkylene group containing from about 5 to about 20 oxyalkylene units.

3. The compound of claim 2 further characterized in that X is an omega-hydroxyethyl-polyoxyethylene radical.

4. The compound as defined in claim 2 further characterized in that X is an omega-hydroxypropyl-polyoxypolypropylene radical.

References Cited in the file of this patent

UNITED STATES PATENTS

| | | |
|---|---|---|
| 1,970,578 | Schoeller et al. | Aug. 21, 1934 |
| 2,173,069 | Ulrich | Sept. 12, 1939 |
| 2,211,001 | Chivola | Aug. 13, 1940 |
| 2,585,826 | Olsen | Feb. 12, 1952 |
| 2,662,898 | Ross et al. | Dec. 15, 1953 |

OTHER REFERENCES

Schwatz-Perry: Surface Active Agents, Interscience (1949) page 191. (Copy Div. 6.)

Lohman: J. Pract. Chem. 153, 57–64 (1939). (Copy P. O. Library.).